(12) United States Patent
Koshiishi

(10) Patent No.: US 10,958,029 B2
(45) Date of Patent: Mar. 23, 2021

(54) ELECTROMAGNETIC CRIMP TERMINAL, MANUFACTURING METHOD OF ELECTROMAGNETIC CRIMP TERMINAL, AND CONNECTING TERMINAL

(71) Applicant: Yazaki Corporation, Tokyo (JP)

(72) Inventor: Makoto Koshiishi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/375,205

(22) Filed: Apr. 4, 2019

(65) Prior Publication Data

US 2019/0319418 A1 Oct. 17, 2019

(30) Foreign Application Priority Data

Apr. 12, 2018 (JP) .............................. JP2018-076927

(51) Int. Cl.
  H01R 43/04 (2006.01)
  H01R 43/048 (2006.01)
  H01R 4/18 (2006.01)

(52) U.S. Cl.
  CPC ........... *H01R 43/048* (2013.01); *H01R 4/183* (2013.01)

(58) Field of Classification Search
  CPC .............................. H01R 43/048; H01R 4/183
  USPC ........................................................ 439/877
  See application file for complete search history.

(56) References Cited

U.S. PATENT DOCUMENTS

| | | | | |
|---|---|---|---|---|
| 3,404,368 A * | 10/1968 | Roberts | ................ | H01R 4/2495 439/866 |
| 5,824,998 A * | 10/1998 | Livshiz | .................. | B21D 26/14 219/617 |
| 5,966,813 A * | 10/1999 | Durand | ................ | B23K 13/025 29/897.2 |
| 6,137,094 A * | 10/2000 | Kistersky | ............... | B21D 26/14 219/603 |
| 6,229,125 B1 * | 5/2001 | Livshiz | .................. | B21D 26/14 219/617 |
| 6,474,534 B2 * | 11/2002 | Gabbianelli | .......... | B21C 37/154 228/131 |

(Continued)

FOREIGN PATENT DOCUMENTS

JP 2007-48522 A 2/2007
JP 2013-201135 A 10/2013

(Continued)

OTHER PUBLICATIONS

Isao Masumoto et al. "Electromagnetic Welding of Aluminum Tube with Aluminum—and Dissimilar Metal Cores" Studies on Electromagnetic Welding (Report 1), vol. 49, No. 1, 1980 (pp. 29-35).

*Primary Examiner* — Alexander Gilman
(74) *Attorney, Agent, or Firm* — Sughrue Mion, PLLC

(57) ABSTRACT

An electromagnetic crimp terminal includes an electric wire and a terminal plate. The electric wire includes a conductor portion, an insulation portion which covers the conductor portion, and an exposed portion which is a part of the conductor portion exposed from the insulation portion. The terminal plate includes a crimped portion. The crimped portion is crimped onto the exposed portion. The crimped portion includes a first side edge and a second side edge. A vicinity of the first side edge and a vicinity of the second side edge overlap each other.

4 Claims, 7 Drawing Sheets

(56) References Cited

U.S. PATENT DOCUMENTS

| | | | | |
|---|---|---|---|---|
| 6,875,964 B2* | 4/2005 | Golovashchenko | ..... | H05B 6/14 |
| | | | | 219/603 |
| 7,026,585 B2* | 4/2006 | Yablochnikov | .......... | B23K 9/09 |
| | | | | 219/602 |
| 7,127,816 B2* | 10/2006 | Kiehl | .................. | B23K 9/0288 |
| | | | | 29/897.2 |
| 7,256,373 B2* | 8/2007 | Gafri | ...................... | B21D 26/14 |
| | | | | 219/603 |
| 7,364,062 B2* | 4/2008 | Moore | ................... | B23K 20/06 |
| | | | | 228/115 |
| 7,513,025 B2* | 4/2009 | Fischer | .................. | B21D 26/14 |
| | | | | 285/18 |
| 8,221,171 B2* | 7/2012 | Ono | ....................... | H01R 4/185 |
| | | | | 439/877 |
| 10,003,136 B2* | 6/2018 | Ohnuma | ................ | H01R 4/185 |
| 2005/0026515 A1* | 2/2005 | Hashimoto | ............ | H01R 4/185 |
| | | | | 439/877 |
| 2007/0029103 A1* | 2/2007 | Hanasaki | ............... | B23K 13/01 |
| | | | | 174/88 R |
| 2013/0213710 A1* | 8/2013 | Ohnuma | ................ | H01R 4/185 |
| | | | | 174/84 C |
| 2016/0013567 A1* | 1/2016 | Sakaguchi | ............. | H01R 4/185 |
| | | | | 439/877 |
| 2017/0018858 A1* | 1/2017 | Ohnuma | ................ | H01R 4/185 |

FOREIGN PATENT DOCUMENTS

| | | |
|---|---|---|
| JP | 3207597 U | 11/2016 |
| WO | 2012/050239 A1 | 4/2012 |

\* cited by examiner

C-C CROSS SECTION

C-C CROSS SECTION (ENLARGED PORTION)

ELECTROMAGNETIC CRIMP TERMINAL, MANUFACTURING METHOD OF ELECTROMAGNETIC CRIMP TERMINAL, AND CONNECTING TERMINAL

CROSS-REFERENCE TO RELATED APPLICATIONS

This application is based on and claims priority under 35 USC 119 from Japanese Patent Application No. 2018-076927 filed on Apr. 12, 2018, the contents of which are incorporated herein by reference.

TECHNICAL FIELD

The present disclosure relates to an electromagnetic crimp terminal, a manufacturing method of the electromagnetic crimp terminal, and a connecting terminal. Moreover present disclosure relates to an electromagnetic crimp terminal whose terminal is electromagnetically crimped onto a terminal plate, a manufacturing method of the electromagnetic crimp terminal, and a connecting terminal having a press-formed terminal plate.

BACKGROUND ART

In the related art, a terminal plate is crimped onto an end portion of an electric wire of a connecting terminal for transmitting a power supply current and an electric signal. Such crimping is known as crimping by mechanical caulking or crimping by metallurgical welding. In the crimping by mechanical caulking, a part of the terminal plate bites into an electric conductor forming the electric wire and a periphery of the electric conductor may not be uniformly pressed.

Considering a difficulty of uniform welding in metallurgical welding due to partial heat generation, Reference Document 1 discloses a technique that enables uniform welding is disclosed.

Reference Document 1: JP-A-2007-048522 (Pages 5-7, and FIG. 10)

Reference Document 2 discloses a technique for uniformly crimping two objects by an electromagnetic force.

Reference Document 2: Journal of the Japan Welding Society Journal Vol. 49, (1980) No. 1, pp. 29-33

According to Reference Document 1, an electric wire is crimped to a flat plate portion of a terminal plate, and core wires of the electric wire are loosened and aligned uniformly on the terminal plate. Therefore, the work is complicated and it is difficult to crimp the electric wire (power transmission body) onto a substantially cylindrical portion of the terminal plate while maintaining a substantially columnar shape in a cross section of the electric wire.

According to Reference Document 2, one cylinder is inserted into the other cylinder, the cylinder on an outer side is reduced in diameter due to an electromagnetic force, and both cylinders are electromagnetically crimped against each other. Accordingly, both cylinders are uniformly crimped in a circumferential direction. Therefore, if a cylindrical portion is formed on the terminal plate and an electric wire is inserted into the cylindrical portion to perform electromagnetic crimping, a connecting terminal having a cylindrical portion in which the electric wire (conductive portion) is uniformly crimped would be manufactured.

However, since outer diameters of electric wires (conductive portion) vary depending on specifications of the electric wires, it is complicated and difficult to prepare terminal plates having various cylindrical portions corresponding to the various outer diameters of the electric wires. Further, when a plate-like original plate is bent to form a cylindrical portion, it is necessary to weld side edges of the original plate, resulting in an increase in manufacturing cost.

SUMMARY OF INVENTION

Aspect of non-limiting embodiments of the present disclosure relates to a connecting terminal in which electric wires (conductive parts) with various outer diameters are crimped uniformly and which is manufactured at low cost with a simple work, a method for manufacturing the connecting terminal, and a connecting terminal lowering the manufacturing cost.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an electromagnetic crimp terminal including: an electric wire; and a terminal plate, in which the electric wire includes a conductor portion, an insulation portion which covers the conductor portion, and an exposed portion which is a part of the conductor portion exposed from the insulation portion, the terminal plate has a crimped portion having a substantially σ-shaped cross section at a part of the terminal plate, the exposed portion is crimped onto the crimped portion, and the crimped portion is configured to overlap a vicinity of one side edge and a vicinity of the other side edge on the crimped portion.

Since the vicinity of one side edge and the vicinity of the other side edge overlap with each other in the crimped portion in the electromagnetic crimp terminal according to the present disclosure, crimped portions with various diameters are formed from a common terminal plate. Thus, the cost of the electromagnetic crimp terminal is lowered by promoting common use of members.

In addition, since the cylindrical portion can be increased and reduced to various diameters by increasing or reducing the overlapped area in the method for manufacturing the electromagnetic crimp terminal according to the present disclosure, a common terminal plate can be crimped onto the electric wire having conductor portions with various outer diameters. Therefore, since the types of terminal plate can be reduced and the conductor portions with various diameters can be crimped onto the common terminal plate, the common use of members is promoted, and the manufacturing cost of the electromagnetic crimp terminal can be reduced.

In addition, since the diameter of the cylindrical portion is reduced by an electromagnetic force in respond to a fact that it is difficult to crimp the electric wire uniformly in a circumferential direction in the mechanical caulking, the crimped portion crimps the exposed portion uniformly in the circumferential direction. Thus, conductivity between the electric wire and the terminal plate is improved.

BRIEF DESCRIPTION OF DRAWINGS

Exemplary embodiments of the present disclosure will be described in detail based on the following figures, wherein:

FIGS. 2A to 2C schematically illustrate the electromagnetic crimp terminal according to the first embodiment, in which FIG. 2A is a cross sectional view of a part of a front view, FIG. 2B is a cross sectional view of a part of side view, and FIG. 2C is an enlarged cross sectional view of the side view showing a part of FIG. 2B;

DETAILED DESCRIPTION

Hereinafter, an electromagnetic crimp terminal according to a first embodiment and a method for manufacturing an electromagnetic crimp terminal according to a second embodiment will be described with reference to the drawings. Since each drawing is schematically drawn, a shape and size of each member or a positional relationship between members is not limited to the illustrated form.

First Embodiment

Electromagnetic Crimp Terminal

Figure 1:
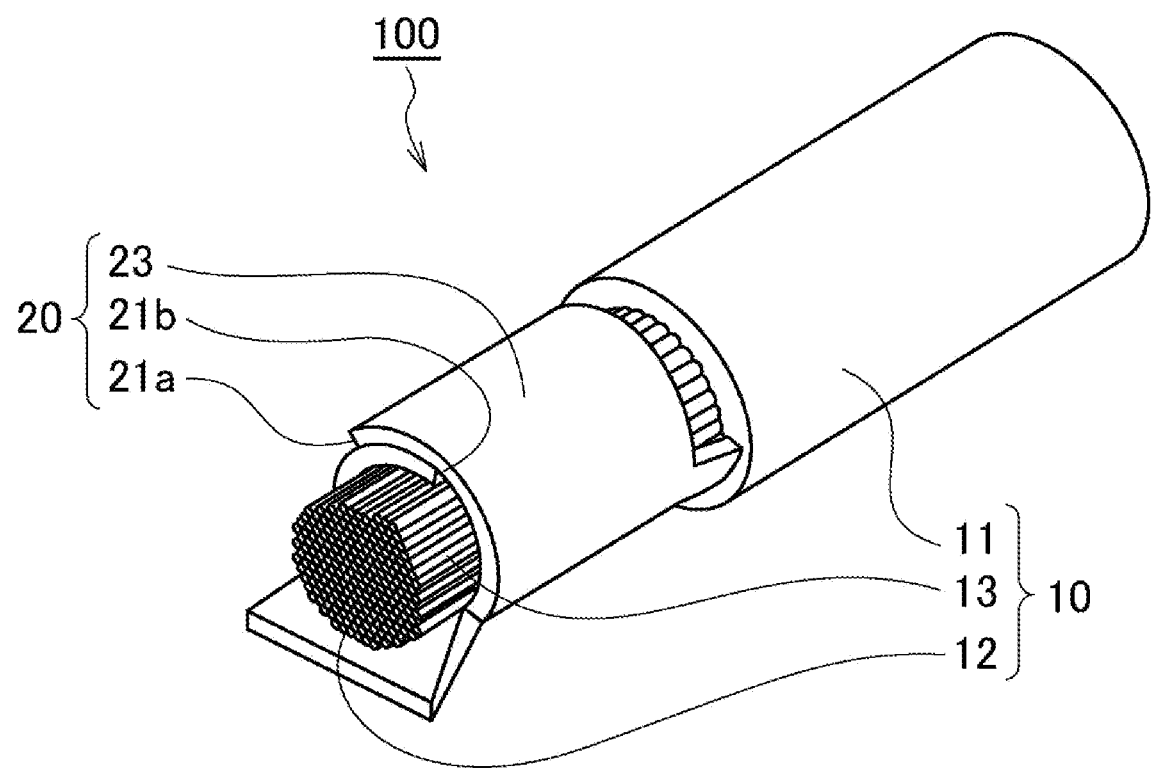
FIG. 1 is a perspective view schematically illustrating an electromagnetic crimp terminal according to a first embodiment.
Figure 2A:
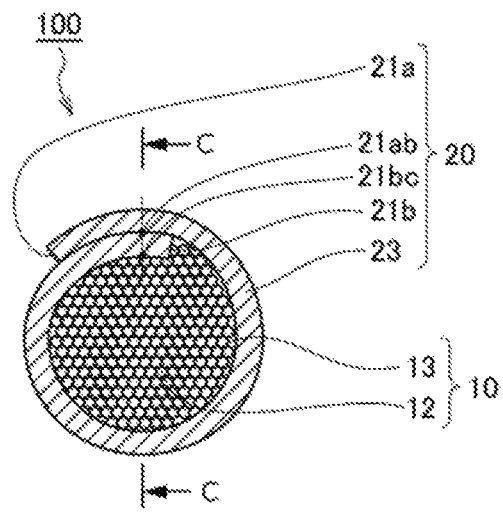
Figure 2B:
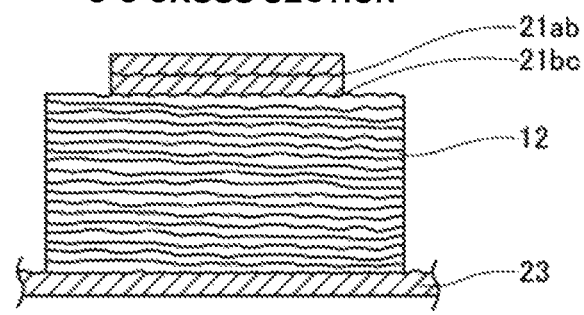
Figure 2C:
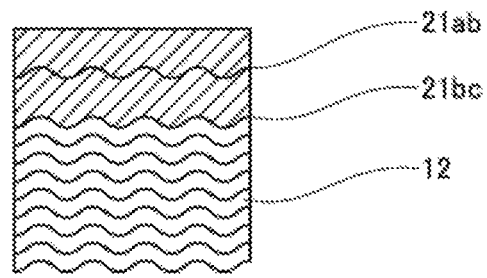

FIG. 1 and FIGS. 2A to 2C schematically illustrate the electromagnetic crimp terminal according to a first embodiment, in which FIG. 1 is a partial perspective view, FIG. 2A is a cross sectional view of a part of a front view, FIG. 2B is a cross sectional view of a part of side view, and FIG. 2C is an enlarged cross sectional view of the side view showing a part of FIG. 2B.

In FIG. 1 and FIGS. 2A to 2C, an electromagnetic crimp terminal 100 includes: an electric wire 10 including a conductor portion 12 whose periphery is covered with an insulation portion 11; and a terminal plate 20 including a crimped portion 23. The crimped portion 23 is electromagnetically crimped (electromagnetic crimping will be described separately in detail) onto a range (hereinafter referred to as "exposed portion") 13 where a part of the insulation portion 11 is peeled off and the conductor portion 12 is exposed.

In the crimped portion 23, a plate-shaped portion 21 (see FIG. 3) corresponding to a front foot barrel portion of the terminal plate 20 which is originally a flat plate is formed to have a substantially σ (sigma)-shaped cross section. That is, a vicinity of one side edge 21a (an upper oblique line portion in FIG. 2B) and a vicinity of the other side edge 21b (a middle oblique line portion in FIG. 2B) overlap with each other to form a joining boundary 21ab between terminals, and the vicinity of the other side edge 21b and the conductor portion 12 overlap with each other to form a joining boundary 21bc between the terminal and the electric wire. At this time, both the joining boundary 21ab between the terminals and the joining boundary 21bc between the terminal and the electric wire have wave shapes (see FIG. 2C). At this time, the joining boundary 21ab, the joining boundary 21bc and the electric wire are schematically shown by regular wavy lines, but are normally irregularly repeating smooth uneven surfaces.

In the present disclosure, the "substantially σ-shaped cross section" not refers to a circular ring having a substantially circular cross section, but refers to a shape having end surfaces spaced apart from each other at one position in a circumferential direction and having one end vicinity and the other end vicinity overlapping each other.

At this time, the crimped portion 23 is formed by a manufacturing method (electromagnetic crimping) described later in a second embodiment, and the one side edge 21a and the other side edge 21b overlap with each other, so that the crimped portion 23 is formed with various inner diameters from the common terminal plate 20 where a shape of the plate-shaped portion 21 is unified. That is, since the common terminal plate 20 is electromagnetically crimped onto the electric wire 10 having the conductor portion 12 with various outer diameters, the types of the terminal plate 20 can be reduced, and thus the manufacturing cost and inventory cost of the member are lowered.

A shape of the portion of the terminal plate 20 excluding the crimped portion 23 is not limited. For example, a portion corresponding to a rear foot barrel portion (see FIG. 3) which holds an outer periphery of the insulation portion 11 close to the exposed portion 13 may also has the same form as the crimped portion 23.

Second Embodiment

Method for Manufacturing Electromagnetic Crimp Terminal

Figure 3:
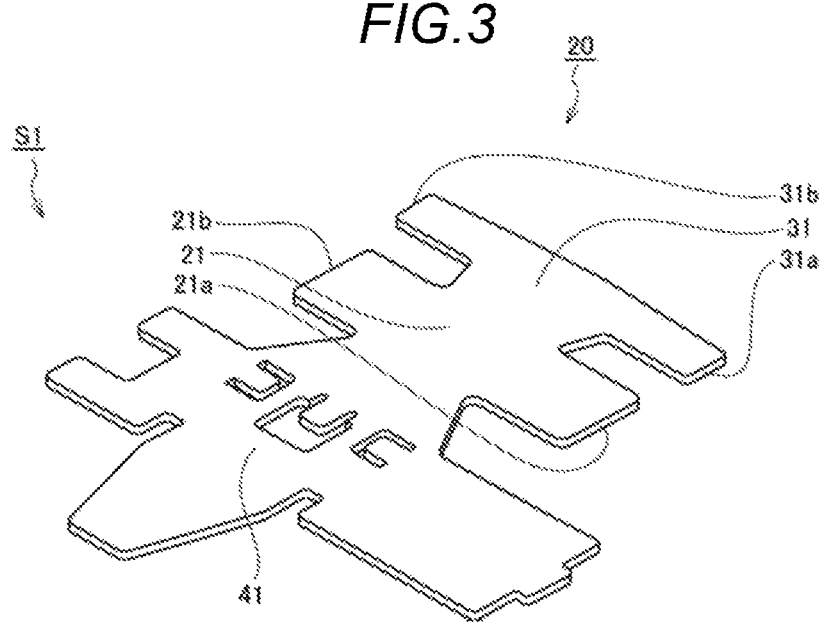
FIG. 3 schematically illustrates a method for manufacturing an electromagnetic crimp terminal according to a second embodiment, showing a perspective view of a step (S1) of forming a terminal plate.
Figure 4:
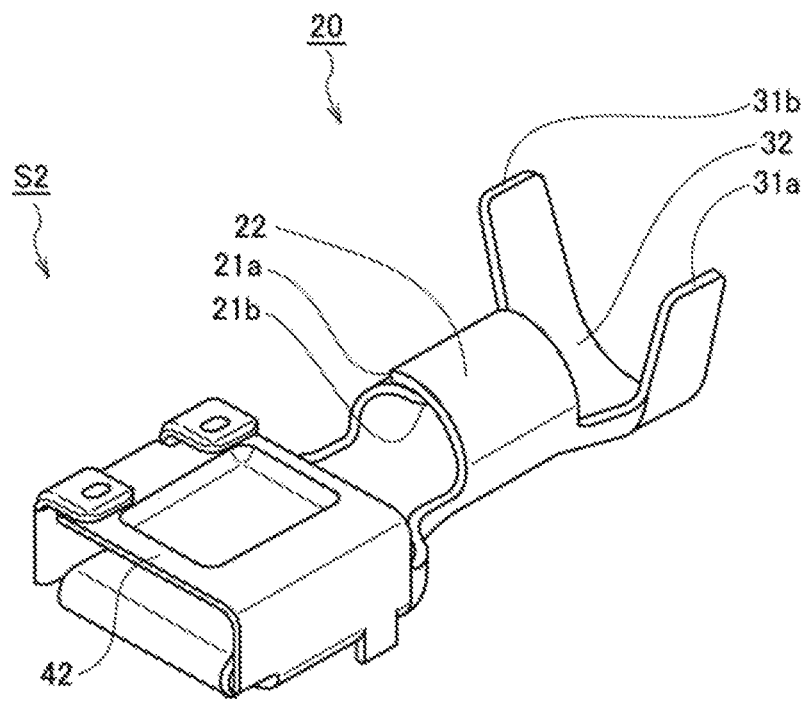
FIG. 4 schematically illustrates the method for manufacturing an electromagnetic crimp terminal according to the second embodiment, showing a perspective view of a step (S2) of pressing, bending and forming a part of the terminal plate.
Figure 5:
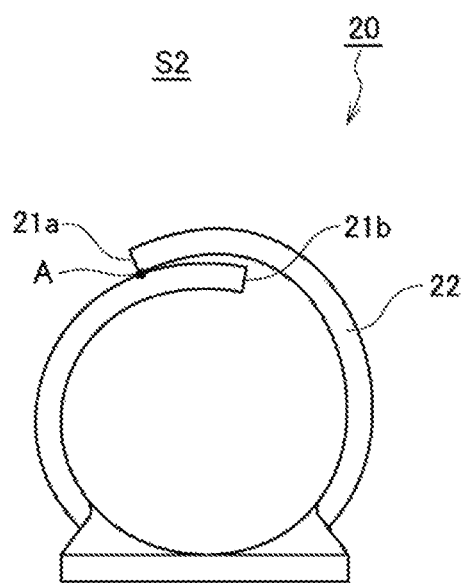
FIG. 5 schematically illustrates the method for manufacturing an electromagnetic crimp terminal according to the second embodiment, showing a front view of the step (S2) of pressing, bending and forming a part of the terminal plate.
Figure 6:
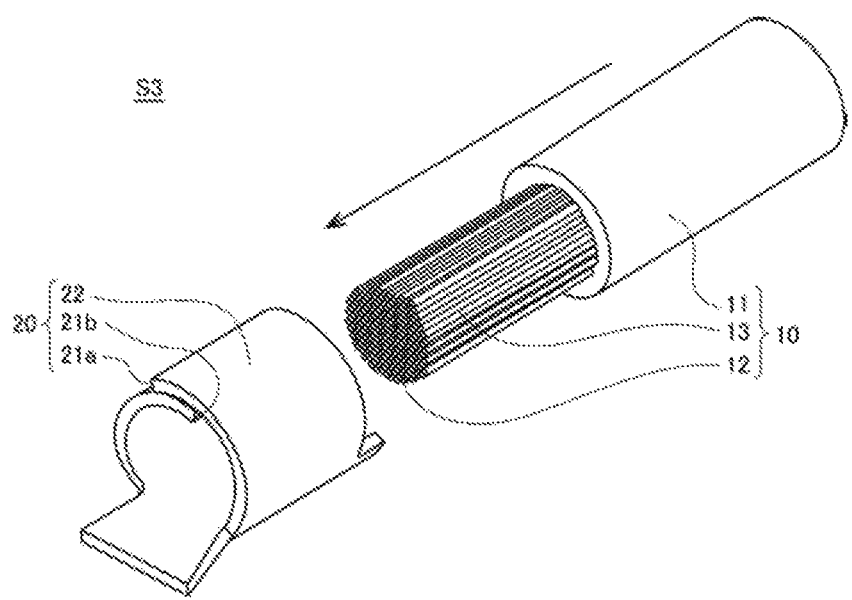
FIG. 6 schematically illustrates the method for manufacturing an electromagnetic crimp terminal according to the second embodiment, showing a perspective view of a step (S3) of inserting a part of the electric wire into a part of the bent and formed terminal plate.
Figure 7:
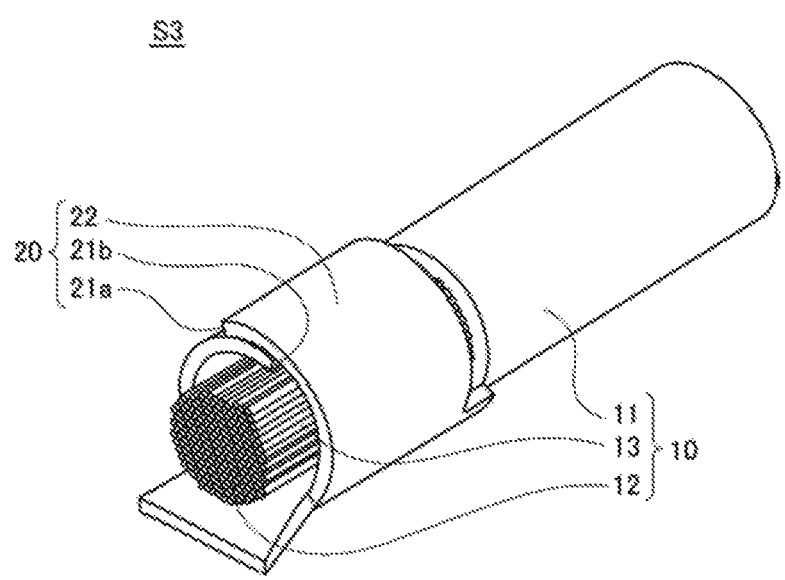
FIG. 7 schematically illustrates the method for manufacturing an electromagnetic crimp terminal according to the second embodiment, showing a perspective view after completing the step (S3) of inserting a part of the electric wire into a part of the bent and formed terminal plate.
Figure 8:
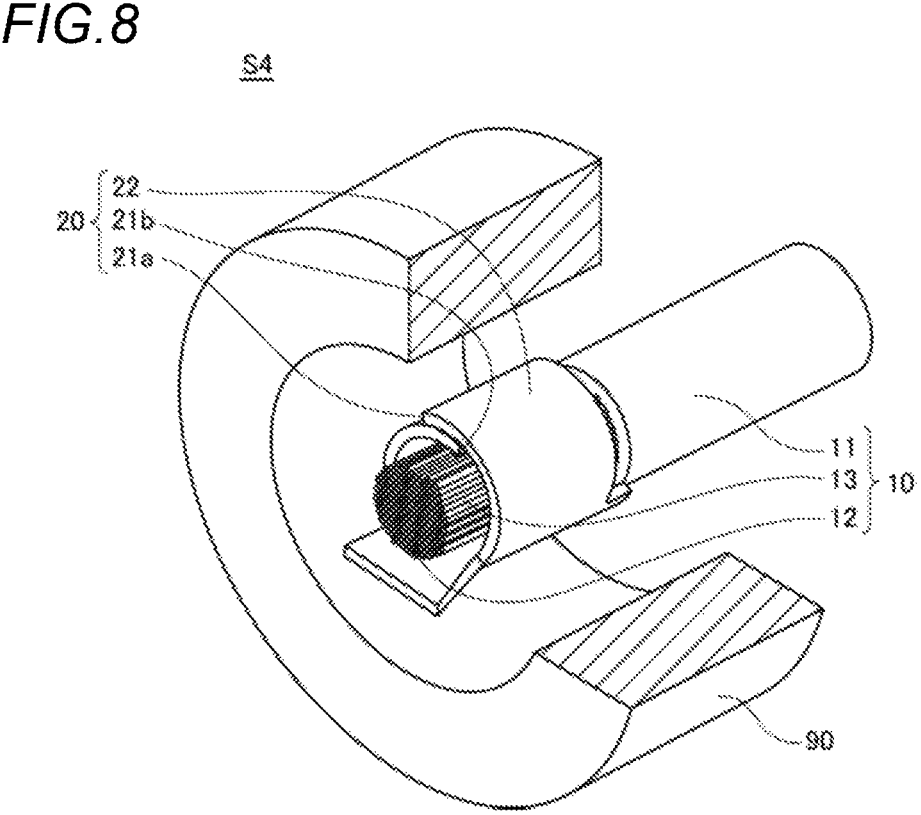
FIG. 8 schematically illustrates the method for manufacturing an electromagnetic crimp terminal according to the second embodiment, showing a perspective view of a partial cross section of a step (S4) of inserting a part of the terminal plate into a discharge coil.
Figure 9:
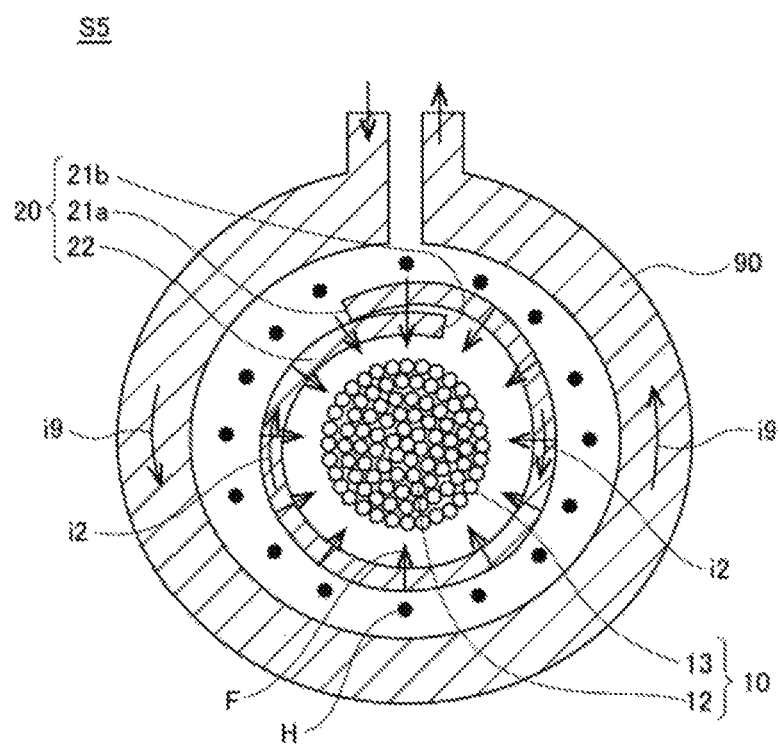
FIG. 9 schematically illustrates the method for manufacturing an electromagnetic crimp terminal according to the second embodiment, showing a cross sectional view of a front view of a step (S5) of instantaneously flowing a discharge current.

FIG. 3 to FIG. 9 schematically illustrate a method for manufacturing an electromagnetic crimp terminal according to a second embodiment, in which FIG. 3 is a perspective view of a step (S1) of forming the terminal plate, FIG. 4 is perspective view of a step (S2) of pressing, bending and forming a part of the terminal plate, FIG. 5 is a front view showing a part of FIG. 4, FIG. 6 and FIG. 7 are respectively perspective views during performing and of after completing a step (S3) of inserting a part of the electric wire into a part of the bent and formed terminal plate, FIG. 8 is a perspective view of a partial cross section of a step (S4) of inserting a part of the terminal plate into a discharge coil, and FIG. 9 is a cross sectional view of a front view of a step (S5) of instantaneously flowing a discharge current.

In FIG. 3 to FIG. 9, the method for manufacturing an electromagnetic crimp terminal is to manufacture the electromagnetic crimp terminal 100 by the following steps.

In FIG. 3, the terminal plate 20 including a rectangular plate-shaped portion 21 forming the crimped portion 23 is formed (S1). The terminal plate 20 includes the plate-shaped portion 21 corresponding to the front foot barrel portion, a rear plate-shaped portion 31 corresponding to the rear foot barrel portion, and a tip plate-shaped portion 41 corresponding to a box-shaped female terminal. In the present disclosure, the form (such as size and shape) of the terminal plate 20 is not limited, and grooves and irregularities may be provided in the plate-shaped portion 21.

In FIG. 4 and FIG. 5, at least the plate-shaped portion 21 is pressed, bent and formed to form a cylindrical portion 22 having a substantially σ-shaped cross section, and the vicinity of the one side edge 21a and the vicinity of the other side edge 21b of the plate-shaped portion 21 overlap with each other (S2). At this time, the one side edge 21a disposed on an outer side (precisely, an angle portion between the one side edge 21a and an inner surface) is brought into contact (indicated by "contact A" in FIG. 5) an outer surface slightly away from the other side edge 21b disposed on an inner side, so that an annular conductive circuit can be formed.

The contact A may be a single continuous line (having a uniform or non-uniform width) over the entire length of the one side edge 21a, or may be a plurality of intermittent and intermittent lines or a point.

In addition, in pressing, bending and forming the plate-shaped portion 21 or before and after pressing, bending and forming the plate-shaped portion 21, the rear plate-shaped portion 31 is formed into a substantially U-shaped groove portion 32, and the tip plate-shaped portion 41 is formed into a box-shaped portion 42 having a rectangular cross section.

In FIG. 6 to FIG. 9, the exposed portion 13, which is a part of the conductor portion 12 of the electric wire 10, is inserted into the cylindrical portion 22 (see FIGS. 6 and 7; S3).

Then, the cylindrical portion 22, into which the exposed portion 13 is inserted, is inserted into a discharge coil 90 having a substantially C-shaped cross section (see FIG. 8; S4), and an discharge current i9 instantaneously flows through the discharge coil 90 (see FIG. 9; S5). In this way, the electromagnetic crimp terminal 100 is completed by the electromagnetic force (this will be separately described in detail).

In FIG. 9, when the discharge current i9 flows through the discharge coil 90 (in a counterclockwise direction in FIG. 9), a magnetic field H (in a direction perpendicular to the paper surface in FIG. 9) between the discharge coil 90 on the outer side and the cylindrical portion 22 on the inner side is generated due to the discharge current i9 (Ampere's right-handed screw rule). At this time, an induced current i2 (in a clockwise direction in FIG. 9) is generated in the cylindrical portion 22 due to electromagnetic induction (Lenz's law and Ampere's right-handed screw rule). Therefore, an electromagnetic force F in a diameter reducing direction based on the magnetic field H and the induced current i2 is applied to the cylindrical portion 22 (Fleming's left hand rule).

Thus, the cylindrical portion 22 reduced in diameter (same as the "crimped portion 23") is conductively crimped onto the exposed portion 13 of the electric wire 10, and thus the electromagnetic crimp terminal 100 is manufactured (see FIGS. 1 and 2).

As described above, the crimped portion 23 is formed into the cylindrical portion 22 having a substantially σ-shaped cross section by pressing, bending and forming the plate-shaped portion 21 which is originally a rectangular plate and then reduced in diameter, the vicinity of the one side edge 21a and the vicinity of the other side edge 21b overlap with each other. Therefore, various diameters can be obtained by increasing or decreasing the overlapped area.

That is, since the common terminal plate 20 having a plate-shaped portion with a uniform shape can be crimped onto the electric wire 10 having the conductor portions 12 with various outer diameters, the types of the terminal plate 20 can be reduced and the manufacturing cost and inventory cost of the member can be reduced. In addition, in respond to a fact that it is difficult to crimp the electric wire 10 uniformly in the circumferential direction in the mechanical caulking, the crimped portion 23 and the exposed portion 13 are crimped uniformly in the circumferential direction in electromagnetic crimping. Thus, the conductivity between the electric wire 10 and the terminal plate 20 is improved.

Modification

Figure 10:
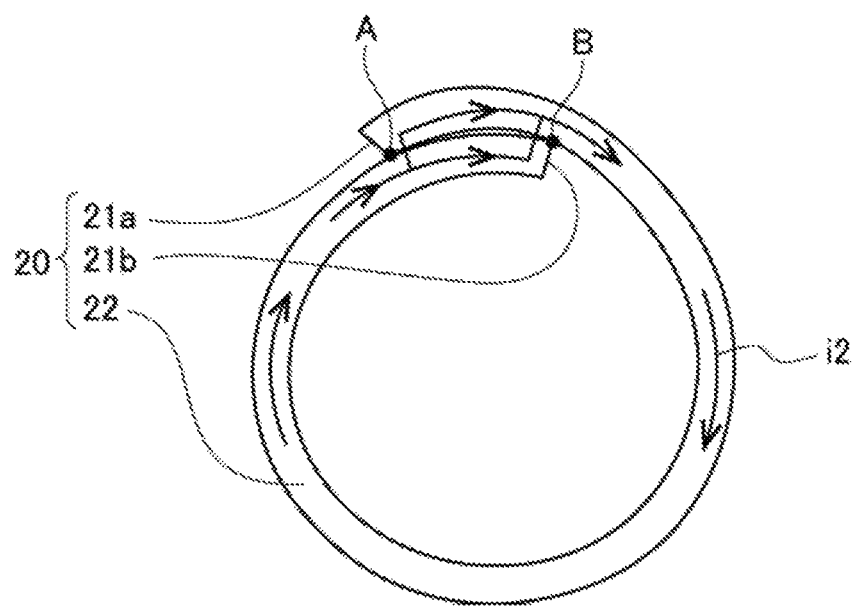
FIG. 10 schematically illustrates the method for manufacturing an electromagnetic crimp terminal according to the second embodiment, showing a front view of a part of a step (S2) of pressing, bending and forming a part of the terminal plate according to a first modification.
Figure 11:
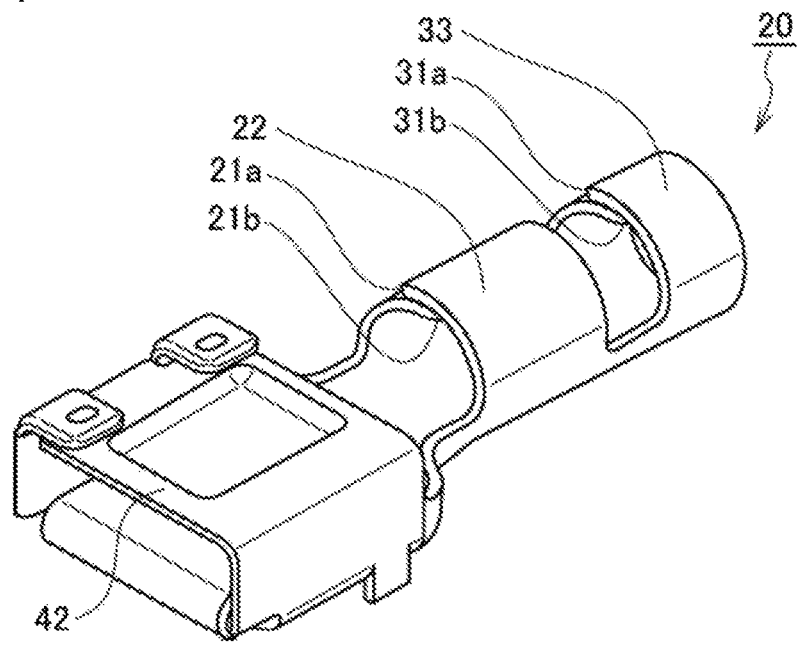
FIG. 11 schematically illustrates the method for manufacturing an electromagnetic crimp terminal according to the second embodiment, showing a perspective view of a step (S2) of pressing, bending and forming a part of the terminal plate according to a second modification.

FIG. 10 and FIG. 11 schematically illustrate the method for manufacturing an electromagnetic crimp terminal according to the second embodiment, in which FIG. 10 is a front view of a part of a step (S2) of pressing, bending and forming a part of the terminal plate according to a first modification, and FIG. 11 is a perspective view of a step (S2) of pressing, bending and forming a part of the terminal plate according to a second modification.

First Modification

In FIG. 10, in the cylindrical portion 22, the one side edge 21a disposed on the outer side (precisely, the angle portion between the one side edge 21a and the inner surface) is brought into contact the outer surface slightly away from the other side edge 21b disposed on the inner side, and the other side edge 21b (precisely, an angle portion between the other side edge 21b and the outer surface) is brought into contact with the inner surface slightly away from the one side edge 21a. That is, since the one side edge 21a and the other side edge 21b contact with each other at two positions in the circumferential direction to increase the contact area, the electric resistance with respect to the induced current i2 is lowered, and as a result, the electromagnetic force F is increased. The contact in an axial direction of the electromagnetic crimp terminal 100 may be a continuous linear shape or an intermittent linear or dot shape.

Second Modification

In FIG. 11, in pressing, bending and forming the plate-shaped portion 21 (S2) or before and after pressing, bending and forming the plate-shaped portion 21 (S2), the rear plate-shaped portion 31 is pressed, bent and formed to into a rear cylindrical portion 33 having substantially σ-shaped cross section, and a vicinity of one side edge 31a and a vicinity of the other side edge 31b in the rear plate-shaped portion 31 overlap with each other. That is, in steps same as the above steps (S3 to S5) in the front foot barrel portion, the rear foot barrel portion is also formed to hold the insulation portion 11 of the electric wire 10 by the electromagnetic force.

At this time, a discharge coil (not shown) for the rear cylindrical portion 33 may be provided, or the discharge coil 90 for the cylindrical portion 22 may be used for electromagnetically forming the rear cylindrical portion 33.

Therefore, since the front foot barrel portion and the rear foot barrel portion can be formed by a processing device using same principle, the working process and working device are simplified, and the manufacturing cost is lowered.

In the above description, the exposed portion 13 is inserted into the cylindrical portion 22. However, instead of this, the exposed portion 13 may be first placed on the plate-shaped portion 21, and then the plate-shaped portion 21 may be bent in a state where the exposed portion 13 is placed thereon, so as to form the cylindrical portion 22 having a substantially σ-shaped cross section and surrounding the exposed portion 13. Then, in order to prevent springback after bending, the cylindrical portion 22 is held by a non-magnetic jig and the held cylindrical portion 22 is inserted into the discharge coil 90. In this way, the troublesome work of inserting the exposed portion 13 into the cylindrical portion 22 is eliminated.

As described above, the crimped portion 23 is formed into the cylindrical portion 22 having a substantially σ-shaped cross section by pressing, bending and forming the plate-shaped portion 21 which is originally a rectangular plate and then reduced in diameter, the vicinity of the one side edge 21a and the vicinity of the other side edge 21b overlap with each other. Therefore, various diameters can be obtained by increasing or decreasing the overlapped area.

That is, since the common terminal plate 20 having a plate-shaped portion with a uniform shape can be crimped onto the electric wire 10 having the conductor portions 12 with various outer diameters, the types of the terminal plate 20 can be reduced and the manufacturing cost and inventory cost of the member can be reduced. In addition, in respond to a fact that it is difficult to crimp the electric wire 10 uniformly in the circumferential direction in the mechanical caulking, the crimped portion 23 and the exposed portion 13 are crimped uniformly in the circumferential direction in electromagnetic crimping. Thus, the conductivity between the electric wire 10 and the terminal plate 20 is improved.

Third Modification

It is obvious that the diameter reduction of the cylindrical portion 22 formed to have a substantially σ-shaped cross section is not the only means of electromagnetic crimping. As described above, the types of the terminal plate 20 can be reduced and the manufacturing cost and inventory cost of the member can be lowered by providing the cylindrical portion 22 formed to have a substantially σ-shaped cross section. However, the present application also discloses an invention that does not limit the diameter reduction means to the electromagnetic crimping, that is, a connecting terminal before the electromagnetic crimping in which the conductor 12 is inserted into the cylindrical portion 22 and both are in contact with each other (see FIG. 7).

The present invention has been described above based on the first and second embodiments. It is understood by those skilled in the art that the first and second embodiments are exemplary, various modifications can be made to each of these components and combinations thereof, and such modifications are also within the scope of the present invention.

According to the above description, the present invention can be widely used as various crimp terminals, various methods for manufacturing a crimp terminal, and various connecting terminals.

REFERENCE SIGNS LIST

10: Electric wire
11: Insulation portion
12: Conductor portion
13: Exposed portion
20: Terminal plate
21: Plate-shaped portion
21a: One side edge
21b: The other side edge
21ab: Joining boundary between terminals
21bc: Joining boundary between terminal and electric wire
22: Cylindrical portion
23: Crimped portion
31: Rear plate-shaped portion
31a: Side edge
31b: Side edge
32: Groove portion
33: Rear cylindrical portion
41: Tip plate-shaped portion
42: Box-shaped portion
90: Discharge coil
100: Electromagnetic crimp terminal
F: Electromagnetic force
H: Magnetic field
i2: Induced current
i9: Discharge current

What is claimed is:

1. A manufacturing method of an electromagnetic crimp terminal, the electromagnetic crimp terminal including an electric wire including a conductor portion whose periphery is covered with an insulation portion and a terminal plate including a crimped portion crimped onto the conductor portion, the manufacturing method comprising:

preparing the terminal plate including a rectangular flat plate portion to be the crimped portion;

forming the flat plate portion into a cylindrical portion, and overlapping a vicinity of a first side edge of the cylindrical portion and a vicinity of a second side edge of the cylindrical portion on each other, so that the cylindrical portion configures an annular conductive circuit prior to crimping to the conductor portion;

inserting an exposed portion, which is a part of the conductor portion of the electric wire exposed by peeling off a part of the insulation portion, into the cylindrical portion while the cylindrical portion configures the annular conductive circuit;

inserting the cylindrical portion into which the exposed portion is inserted into a discharge coil having a substantially C-shaped cross section;

causing a discharge current to instantaneously flow through the discharge coil; and reducing a diameter of the cylindrical portion by an electromagnetic force based on an induced current and an induced magnetic field, and conductively crimping so as to form the crimped portion onto the exposed portion, wherein the induced current is generated in the cylindrical portion due to the discharge current, and the induced magnetic field is generated between the discharge coil and the cylindrical portion due to the induced current.

2. The manufacturing method according to claim 1, wherein the crimped portion has substantially σ-shaped cross section in a cross section perpendicular to a direction in which the electric wire extends.

3. The manufacturing method according to claim 1, wherein the second side edge is in contact with an inner surface of the cylindrical portion near the first side edge, before reducing the diameter of the cylindrical portion.

4. The manufacturing method according to claim 1, wherein the first side edge is in contact with an outer surface of the cylindrical portion near the second side edge, before reducing the diameter of the cylindrical portion.

* * * * *